United States Patent
Young et al.

(10) Patent No.: US 7,731,123 B2
(45) Date of Patent: Jun. 8, 2010

(54) CONTRA-BEVEL DRIVEN CONTROL SURFACE

(75) Inventors: Kendall G. Young, West Melbourne, FL (US); Joseph A. Simon, Crowley, TX (US); Robert S. Cascella, Keller, TX (US); Kevin D. Edge, Pantego, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 828 days.

(21) Appl. No.: 11/534,657

(22) Filed: Sep. 24, 2006

(65) Prior Publication Data
US 2009/0020644 A1    Jan. 22, 2009

(51) Int. Cl.
*B64C 9/04* (2006.01)
(52) U.S. Cl. .......................................... 244/88; 244/119
(58) Field of Classification Search .................... 244/87, 244/99.2, 3.24, 3.27, 3.28, 3.29, 88, 99.3, 244/90 R, 90 A, 49, 46, 22, 11; 74/490.03, 74/490.05, 490.06, 567
See application file for complete search history.

(56) References Cited

U.S. PATENT DOCUMENTS

| | | | | |
|---|---|---|---|---|
| 2,153,667 A | * | 4/1939 | Hoekstra | 244/232 |
| 3,109,613 A | * | 11/1963 | Bryant et al. | 244/219 |
| 3,687,374 A | * | 8/1972 | Nash | 239/265.35 |
| 3,944,170 A | * | 3/1976 | Musgrove | 244/219 |
| 4,247,066 A | * | 1/1981 | Frost et al. | 244/219 |
| 4,286,761 A | * | 9/1981 | Musgrove | 244/99.2 |
| 5,161,757 A | * | 11/1992 | Large | 244/216 |
| 5,761,965 A | * | 6/1998 | Dahlquist | 74/490.03 |
| 6,976,401 B2 | * | 12/2005 | Okamoto et al. | 74/490.05 |

* cited by examiner

*Primary Examiner*—Michael R Mansen
*Assistant Examiner*—Brian M O'Hara
(74) *Attorney, Agent, or Firm*—Bracewell & Giuliani LLP

(57) ABSTRACT

A contra-bevel driven control mechanism repositions a control surface in a fluid environment such as an aerodynamic or hydrodynamic environment. This involves mechanically coupling an airfoil and a control surface. The control surface may pivot about a spanwise axis between upwardly deflected and downwardly deflected positions. A forward beveled rotor mounted to the airfoil and an aft beveled rotor mounted to the control surface counter rotate. The forward beveled rotor rotates about a forward chordwise axis within the airfoil while the aft beveled rotor rotates about an aft chordwise axis within the control surface. The angular rotation between the forward beveled rotor and the aft beveled rotor deflects the aft beveled rotor and the aft chordwise axis within the control surface. Additionally, this method allows the control surface to be deflected with maximum mechanical advantage when the control surface is fully deflected.

20 Claims, 9 Drawing Sheets

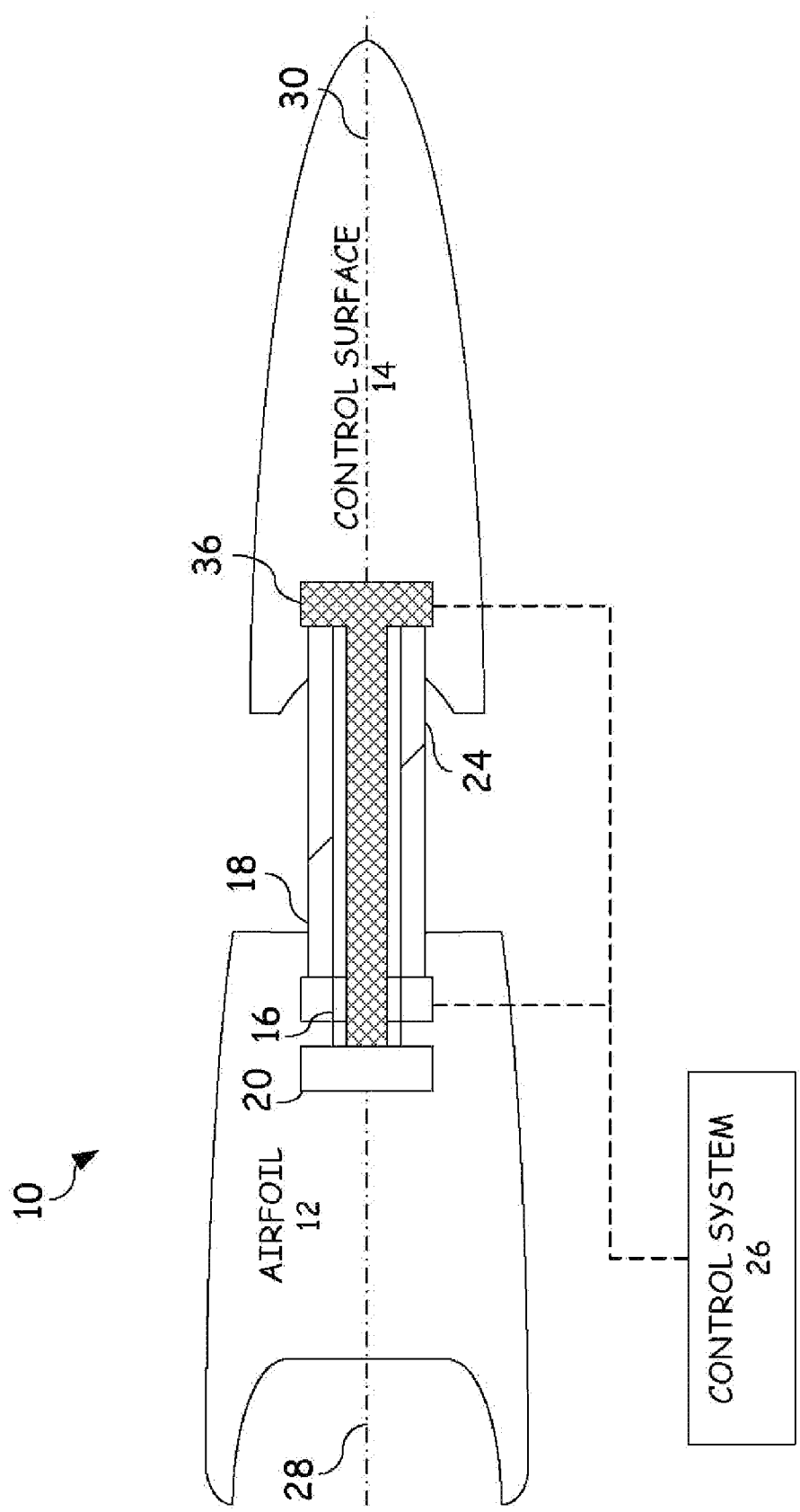

CONTRA-BEVEL DRIVEN CONTROL SURFACE

TECHNICAL FIELD OF THE INVENTION

The present invention relates generally to aircraft control surface, and more particularly, a system and method for actuating control surfaces with increased mechanical advantage.

BACKGROUND OF THE INVENTION

Wing design typically includes a primary wing surface, or airfoil, having a leading edge and a trailing edge with a control surface located at the leading and trailing edges of the wing. Flaps and ailerons are both examples of control surfaces. Flaps increase wing lift and ailerons allow for roll axis control. The flaps increase wing lift by increasing the camber of the wing. By comparison, ailerons pivot oppositely to increase lift on one wing while reducing lift on the opposite wing to induce a roll. Similarly, elevator sections of the horizontal tail pivotably attach to the fixed tail section to vary lift and provide pitch control. When either the flap or the aileron is activated, the control surface rotates relative to the trailing edge of the wing. Control surfaces are typically rigid structures which maintain their shape throughout rotation. This creates discontinuities or abrupt changes at the hinge area of a conventional control surface. This discontinuity increases the drag and lowers the efficiency of the control surface. Additionally, as the control surfaces are repositioned, discontinuities form between the ends of the hinged control surface and the adjacent portions of the airfoil.

Actuation of control surfaces presents difficult integration issues for advanced airframes. Typical flaps/control surfaces employ traditional actuation schemes that require outside mold line (OML) bumps to accommodate large linear actuators and associated bell cranks. Discontinuities or OML bumps can adversely impact the airflow over the airfoil and control surface. Additionally, these actuation schemes often require large packaging (space) requirements and cutouts for hinge actuation.

SUMMARY OF THE INVENTION

The present invention provides a flight control system that substantially addresses the above identified needs, and eliminates or reduces disadvantages and problems associated with previously developed flight control systems. More specifically, the present invention provides a contra-bevel driven control surface to reposition a control surface in a fluid environment such as an aerodynamic or hydrodynamic environment.

One embodiment involves mechanically coupling an airfoil and a control surface. The control surface may pivot about a spanwise axis between upwardly deflected and downwardly deflected positions. A forward beveled rotor mounted to the airfoil and an aft beveled rotor mounted to the control surface counter rotate. The forward beveled rotor rotates about a forward chordwise axis within the airfoil while the aft beveled rotor rotates about an aft chordwise axis within the control surface. The angular rotation between the forward beveled rotor and the aft beveled rotor deflects the aft beveled rotor and the aft chordwise axis within the control surface. Additionally, this method allows the control surface to be deflected with maximum mechanical advantage when the control surface is fully deflected.

Another embodiment of the present invention provides a method to reposition control surfaces. This method involves mechanically coupling an airfoil and control surface where the control surface may pivot about the spanwise axis. A forward beveled rotor, mid beveled rotor(s), and aft beveled rotor rotate about individual chordwise axes. The angular rotation of the beveled rotors causes the beveled rotators to angularly deflect. Thus, the control surface to which the aft beveled rotor is mounted, is deflected as the aft beveled rotor is deflected.

Another embodiment provides a flight control system that includes a controller, control surface, airfoil, and operating mechanism. The control surface mechanically couples to the airfoil and pivots about a spanwise axis. The operator mechanism positions the control surface between upwardly and downwardly deflected positions as directed by the controller. This operator mechanism includes a forward beveled rotor and an aft beveled rotor. Forward beveled rotor is mounted to the airfoil and rotates about a forward chordwise axis. The aft beveled rotor mounts to the control surface and rotates about an aft chordwise axis. The forward beveled rotor and aft beveled rotor may counter rotate at an about equal angular rate. The forward beveled rotor and aft beveled rotor may be driven by individual drive motors or a single drive motor connected to individual gearing mechanisms coupled to each beveled rotor. The controller directs the drive motor(s) to reposition the beveled rotors to achieve a desired deflection of the control surface.

Another embodiment provides a flight control system that again includes a control surface and an airfoil mechanically coupled and an operator mechanism. This operator mechanism includes a forward beveled rotor, mid beveled rotor(s), and aft beveled rotor. The forward beveled rotor, mid beveled rotor(s), and aft beveled rotor rotate relative to individual chordwise axes of the beveled rotors wherein angular rotation between mating surfaces of the beveled rotors causes angular deflection of the chordwise axis associated with individual beveled rotors. The control surface mounted to the aft beveled rotor is deflected as the axis of the aft beveled rotor is deflected.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein:

FIG. 3 depicts another embodiment of the contra-bevel driven flight control system wherein the forward drive motor and aft drive motor are both mounted within an airfoil in accordance with one embodiment of the present invention;

DETAILED DESCRIPTION OF THE INVENTION

Figure 1:
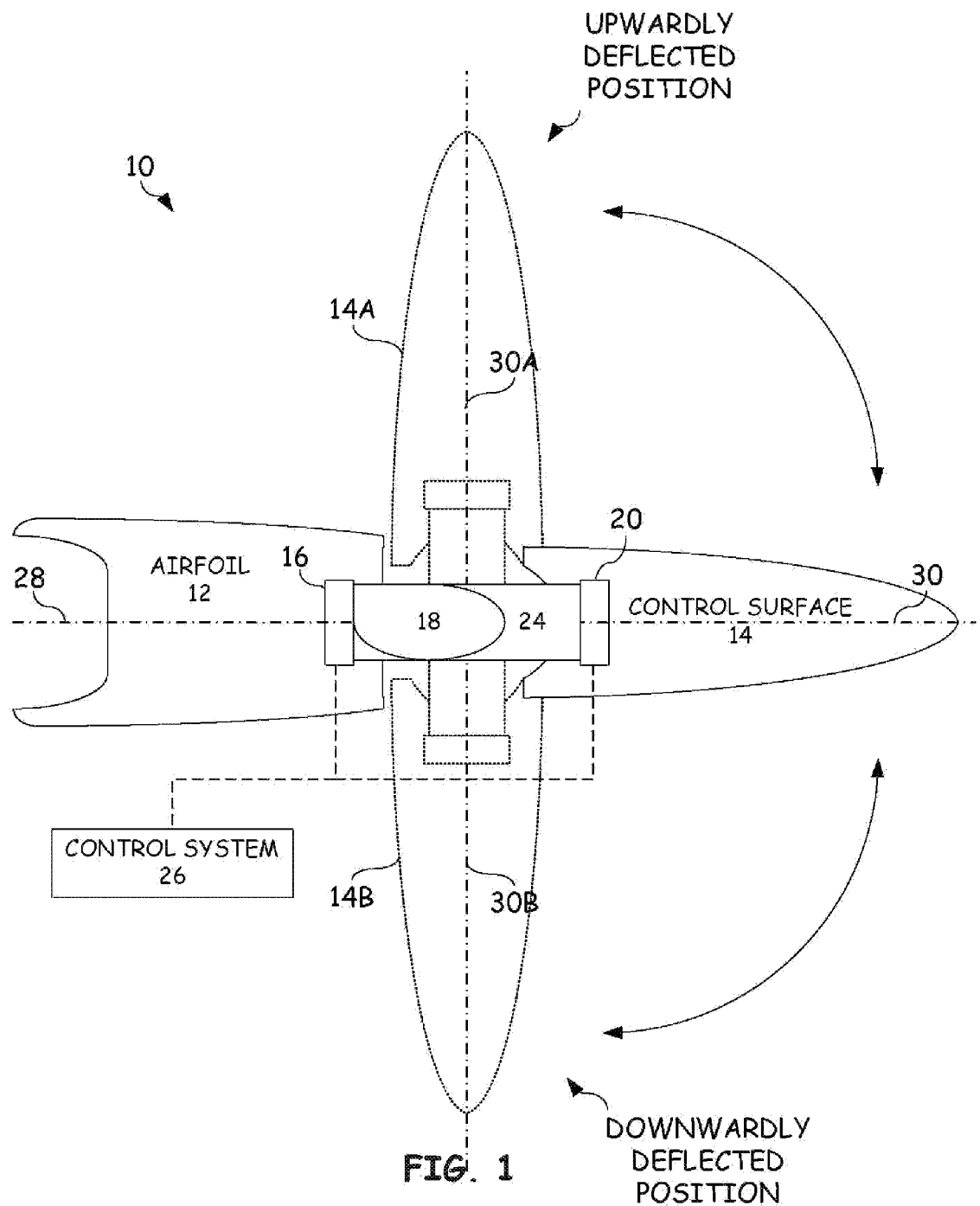
FIG. 1 depicts a contra-bevel driven flight control system in accordance with one embodiment of the present invention.

Preferred embodiments of the present invention are illustrated in the FIGS., like numerals being used to refer to like and corresponding parts of the various drawings.

The FIGS. depict various embodiments of a contra-bevel driven flight control system that may be employed within an aircraft, fluid control system, heating ventilation and air handling system, hydrodynamic vehicle. Although the present invention will be described with particular reference to the embodiments shown in the drawings, it should be understood that the present invention can be embodied in many alternate forms of embodiments. In addition, any suitable size, shape or type of elements or materials could be used.

FIG. 1 depicts a contra-bevel driven flight control system in accordance with one embodiment of the present invention. This flight control system includes an airfoil 12, and a control surface 14. Control surface 14 is mechanically coupled to airfoil 12 and may pivot about a spanwise axis to be deflected in an upwardly-deflected position and a downwardly-deflected position. An operator mechanism positions control surface 14 between the upwardly-deflected and downwardly-deflected positions. This operator mechanism includes a forward-beveled rotor 18, or forward beveled member, mounted to airfoil 12 and an aft-beveled rotor 24, or aft beveled member, mounted to control surface 14. A forward-drive motor 16 couples to forward-drive bevel rotor 18 while aft-drive motor 20 couples to aft-beveled rotor 24. Alternatively properly geared mechanisms may be used such that one drive motor may be used to drive all the beveled rotor segments. Forward-beveled rotor 18 rotates about a forward-chordwise axis 28 while aft-beveled rotor 24 rotates about an aft-chordwise axis 30. Forward-beveled rotor 18 and aft-beveled rotor 24 may counter rotate to reposition control surface 14. The rotation of forward-beveled Rotor 18 and aft-beveled Rotor 24 may be directed by control system 26. The forward-beveled Rotor 18 and aft-beveled Rotor 24 counter rotate at an about equal angular rate.

Controller 26 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

Figure 2:
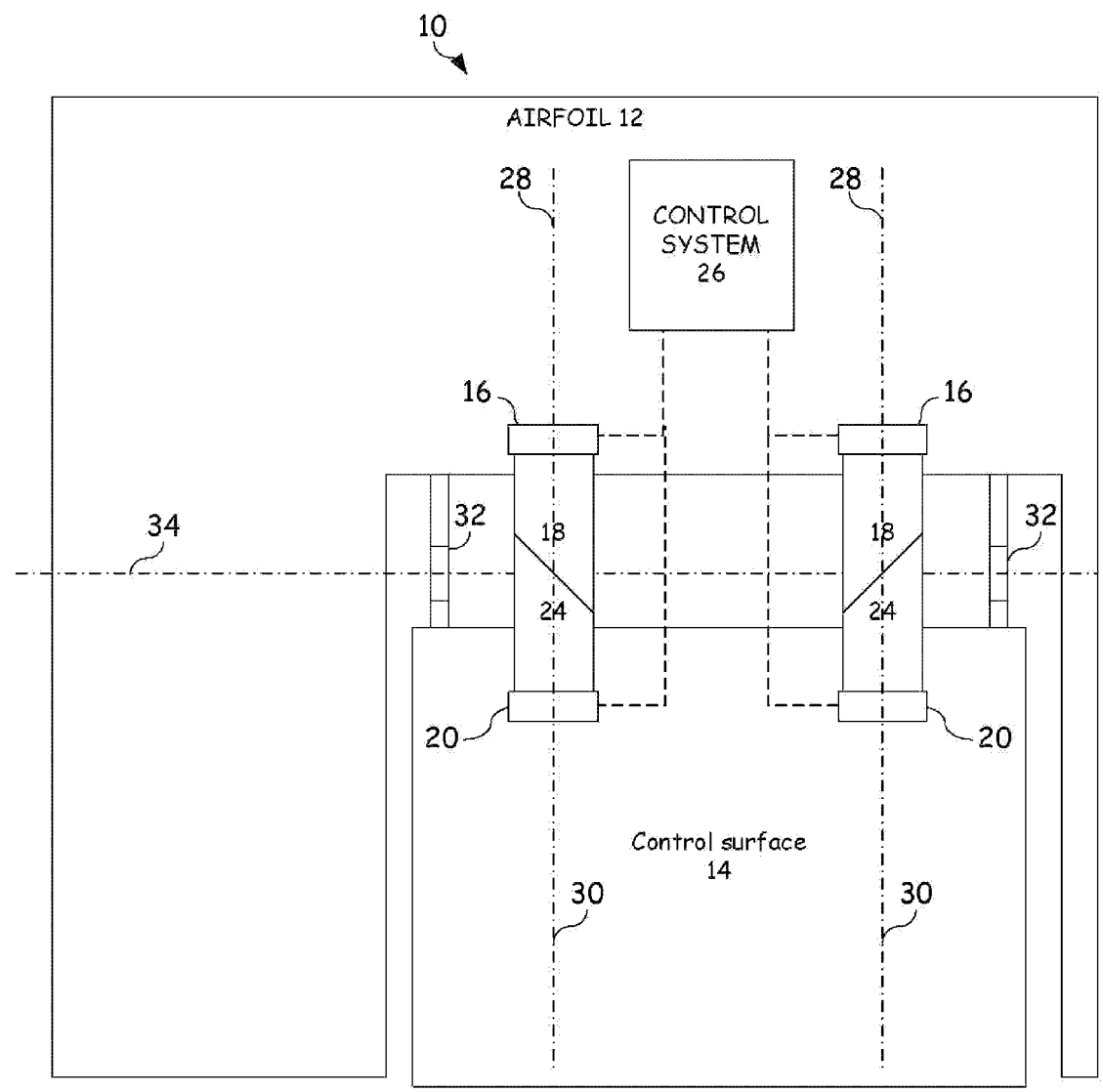
FIG. 2 depicts the top-down view of the contra-bevel driven flight control system provided in accordance with one embodiment of the present invention.

FIG. 2 depicts the top-down view of the contra-bevel driven flight control system 10 presented in FIG. 1. Here one may observe that airfoil 12 may be hingedly attached via hinge mechanisms 32 to control surface 14. This allows the control surface to pivot about spanwise axis 34. Additionally, FIG. 2 depicts that a pair of forward-beveled rotors and aft-beveled rotors that may be used to reposition control surface 14 from a neutral to an upwardly deflected position or downwardly deflected position. As previously stated, control system (controller) 26 may control the angular rate of rotation that drive motors 16 and 20 to rotate the beveled rotors 18 and 24.

FIG. 3 depicts another embodiment of the contra-bevel driven flight control system 10 wherein the forward drive motor 16 and aft drive motor 20 are both mounted with airfoil 12. The universal drive shaft 36 mechanically couples to aft-beveled rotor 24. This allows the weight associated with control surface 14 to be reduced. The forward-beveled rotor 18 and aft-beveled rotor 24 rotate in opposite directions (counter rotate) at about or precisely the same angular rate in order to reposition the control surface 14. In the embodiment shown in FIG. 3 forward-beveled rotor 18 contains an internal cavity to allow universal drive shaft 36 to mechanically couple aft drive motor 20 and aft-beveled rotor 24. This also allows the forward drive motor and aft drive motor to be mounted on the forward chordwise axis of the forward-beveled rotor within airfoil 12. This may simplify the packaging of the motors within the airfoil.

Figure 4A:
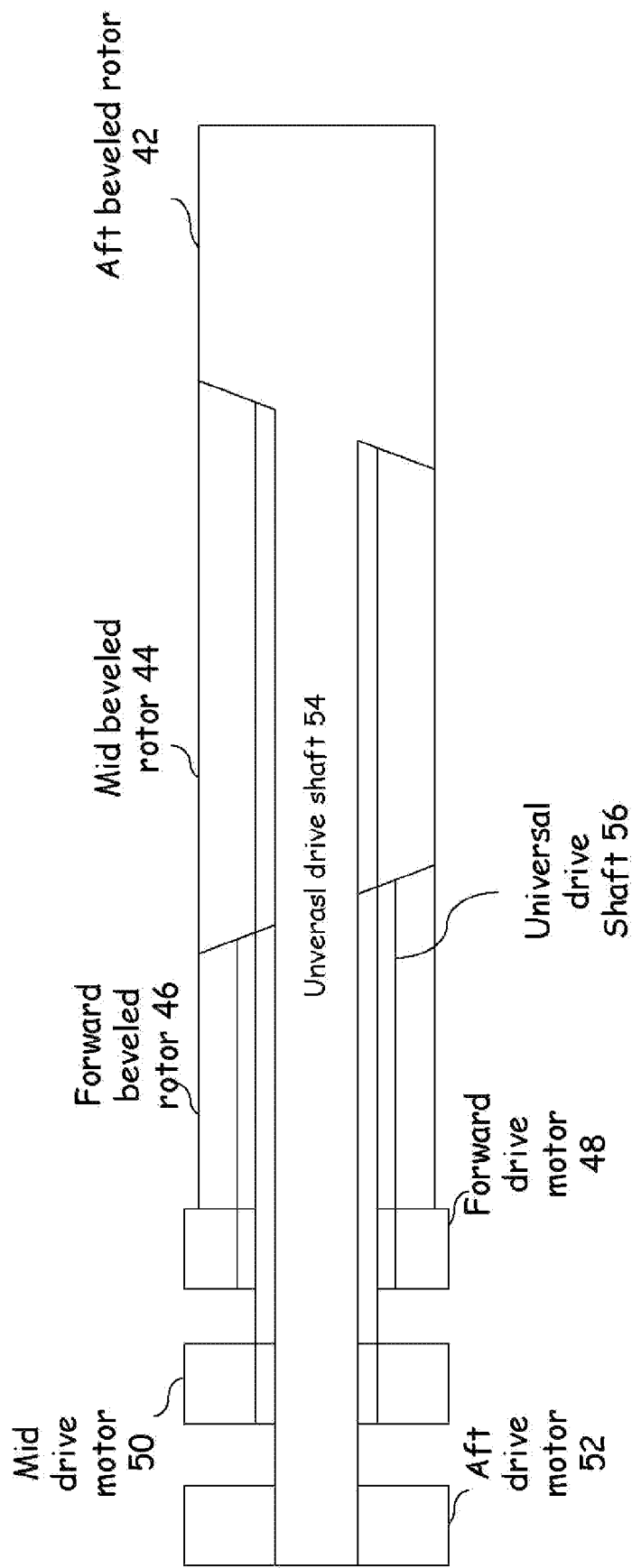
FIGS. 4A and 4B show another embodiment of a multi-segmented contra-bevel driven rotor in accordance with one embodiment of the present invention.
Figure 4B:
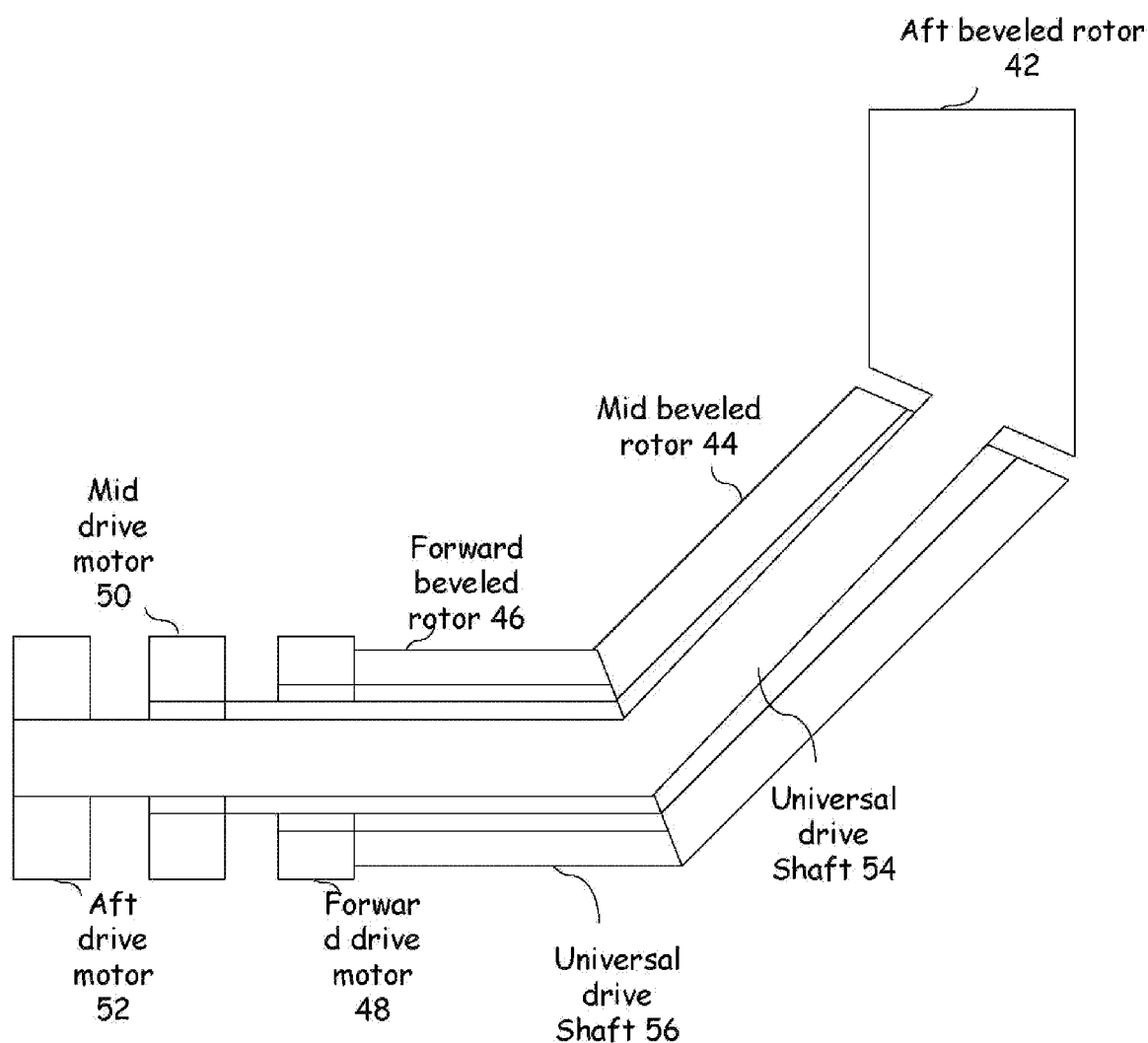

FIGS. 4A and 4B show another beveled rotor flight control system in accordance with embodiments of the present invention. FIG. 4A depicts the contra-bevel driven flight control system in a neutral position while FIG. 4B depicts a contra-bevel driven flight control system in an upwardly deflected position. The bevel may be any complimentary angles. In some instances the beveled angle may differ. The lower deflected position is analogous to the upwardly deflected position. This contra-bevel driven flight control system includes an aft beveled rotor 42, mid beveled rotor 44, forward beveled rotor 46, forward drive motor 48, mid drive motor 50, aft drive motor 52, a universal drive shaft 54 and a second universal drive shaft 56. Although this embodiment depicts the articulation of the control surface using three beveled rotors any number of beveled rotors may be used with the appropriate angular rotation in order to deflect control surface 14. Aft drive motor 52 is mechanically coupled to aft beveled rotor 42 using universal drive shaft 54. Universal drive shaft 54 passes through an internal cavity within the forward beveled rotor sections, i.e., mid beveled rotor 44 and forward beveled rotor 46. Similarly mid drive motor 50 is mechanically coupled to mid beveled rotor 44 using universal drive shaft 56. Within this universal drive shaft 56 is an internal passageway to allow the passage of universal drive shaft 54 to the aft beveled rotor 42. Forward beveled rotor 46 may be directly coupled to forward drive motor 48. Control system 26 as previously described may be used to control the angular rotation of the beveled rotors in order to ensure that proper deflection of control surface 14.

Figure 5:
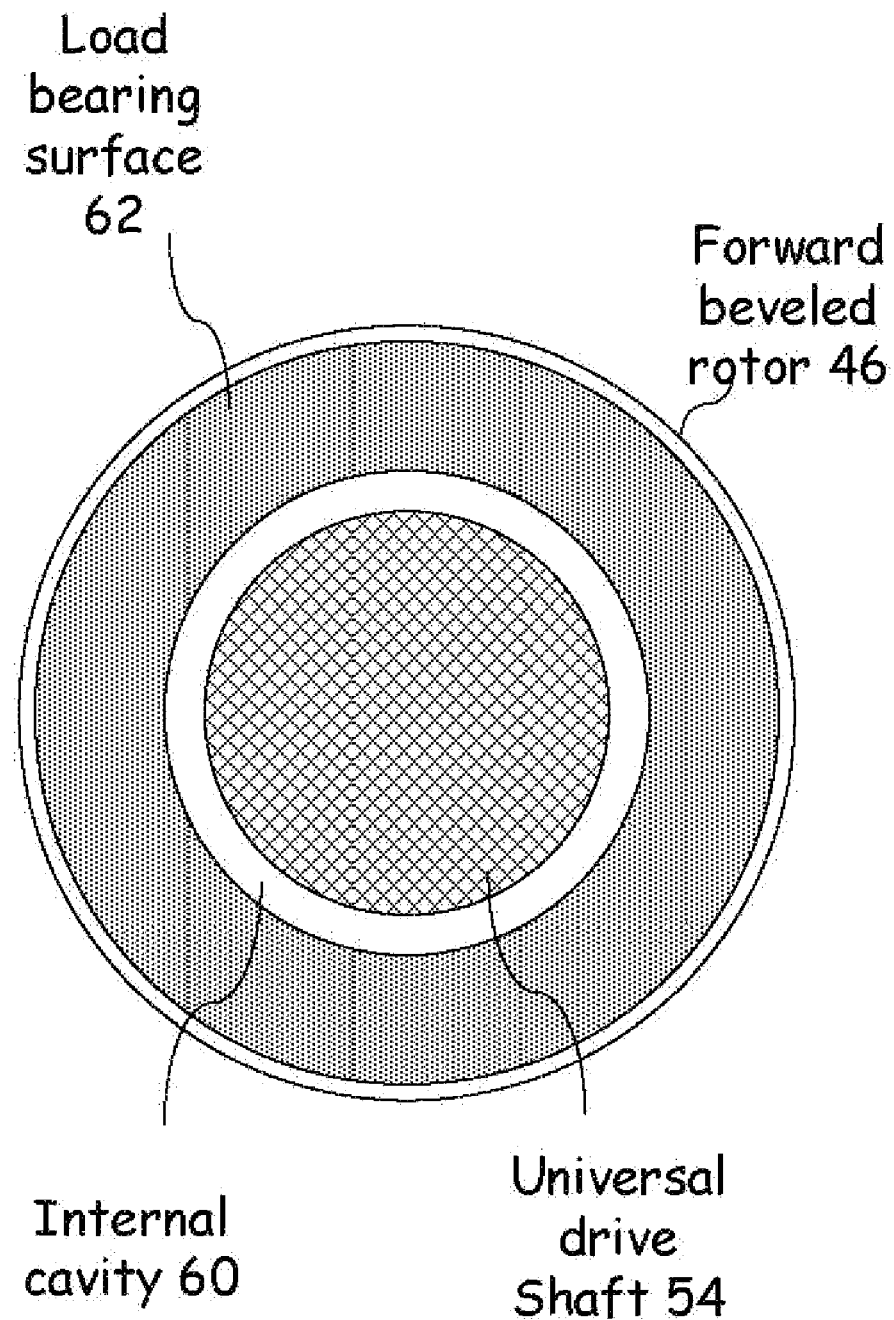
FIG. 5 provides a cross section of a forward segment of a beveled rotor having an internal cavity through which a universal drive shaft may pass and mechanically couple to an aft segment of a beveled rotor.

FIG. 5 provides a cross section of a forward beveled rotor 46 having an internal cavity 60 through which universal drive shaft 54 may pass and mechanically couple to an after beveled rotor. This flight control system may have merely a forward and aft contra bevel rotor(s) or multiple beveled segments that angularly reposition the control surface. As shown here, universal drive shaft 54 passes through internal cavity 60. A load-bearing surface 62 transmits mechanical loads between the rotors to reposition the control surfaces.

This contra-bevel driven flight control system provides many advantages. For example, the mechanical advantage is increased at maximum deflection when compared to prior flight control systems. Additionally, the rate of deflection is dependent on the angular motion of the beveled rotor segments. In fact, an increased rate of deflection at low deflection levels and decreased rate of deflection at high deflection levels may be observed. Depending on the gearing mechanisms used, one drive motor may be used with properly geared mechanisms to drive all the beveled rotor segments.

Returning to FIGS. 4A and 4B. Although FIGS. 4A and 4B depict three individual drive motors for the forward beveled rotor, mid beveled rotor, and aft beveled rotor, a single drive motor may be coupled to individual gearing mechanisms such as a forward gearing mechanism, mid gearing mechanism, and aft gearing mechanism. This allows a single drive motor to be utilized to reposition the control surface. This has an added advantage in that the angular rate of rotation of the individual gearing mechanisms will remain fixed. Thus in an embodiment where two independent drive motors are utilized the potential for different angular rates of rotation could lead to improper positioning of the control surface. By using a single drive motor this problem is reduced or eliminated. This advantage arises from the constant gear ratio driving the individual beveled rotors wherein the individual gear mechanisms are driven by a single drive motor. Those embodiments having one or more mid beveled rotors may couple the control surface to the airfoil using a series of hinge and linkages, or pins and guides.

Figure 6:
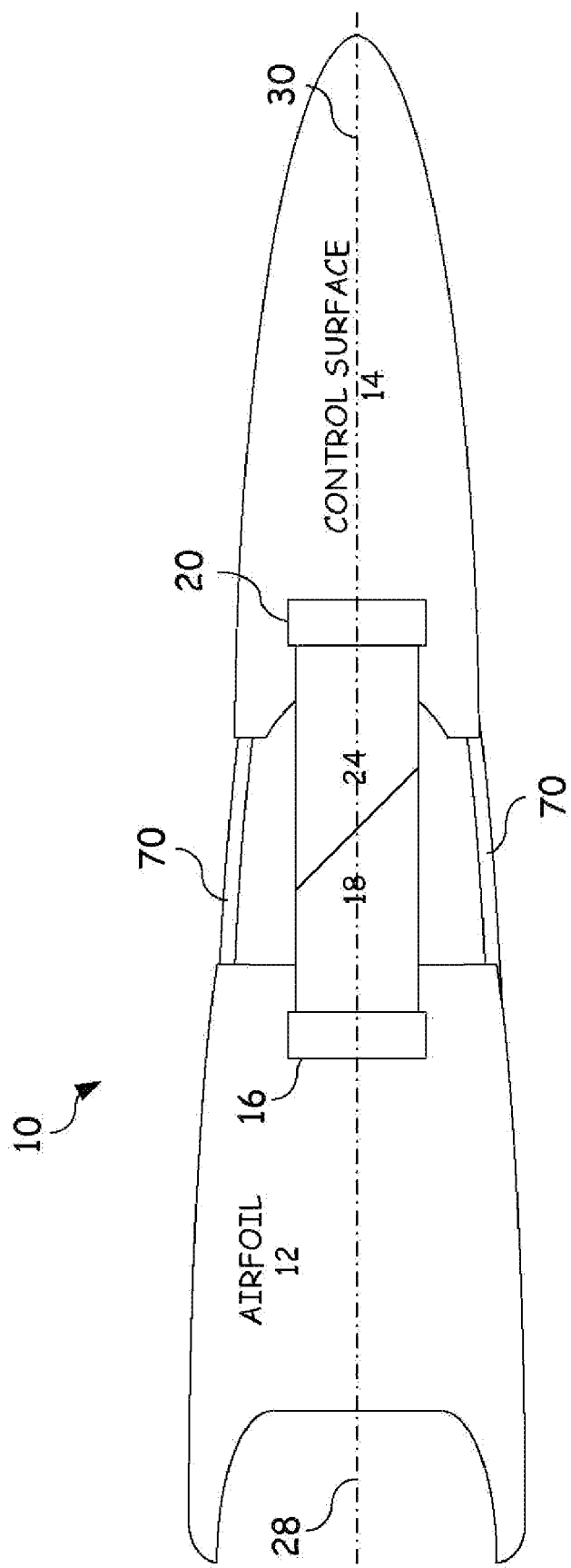
FIG. 6 depicts a contra-bevel driven flight control system in accordance with one embodiment of the present invention having elastomeric or other flexible material to reduce or eliminate discontinuities between the airfoil and control surface.

FIG. 6 depicts a contra-bevel driven flight control system in accordance with one embodiment of the present invention having elastomeric or other flexible material to reduce or eliminate discontinuities between the airfoil and control surface. In this embodiment transition pieces 70 which may an elastomeric or other flexible material may be utilized in order to provide a smooth transition from the airfoil to the control surface. This may reduce drag by avoiding discontinuities on the surface of the airfoil. As shown here, in the cross section of the flight control system the transition pieces 70 have been placed along the chordwise spanning gap, between control surface 14 and airfoil 12. Additionally, similar transition pieces may be placed between the spanwise gap that may exist between control surface 14 and airfoil 12.

Figure 7:
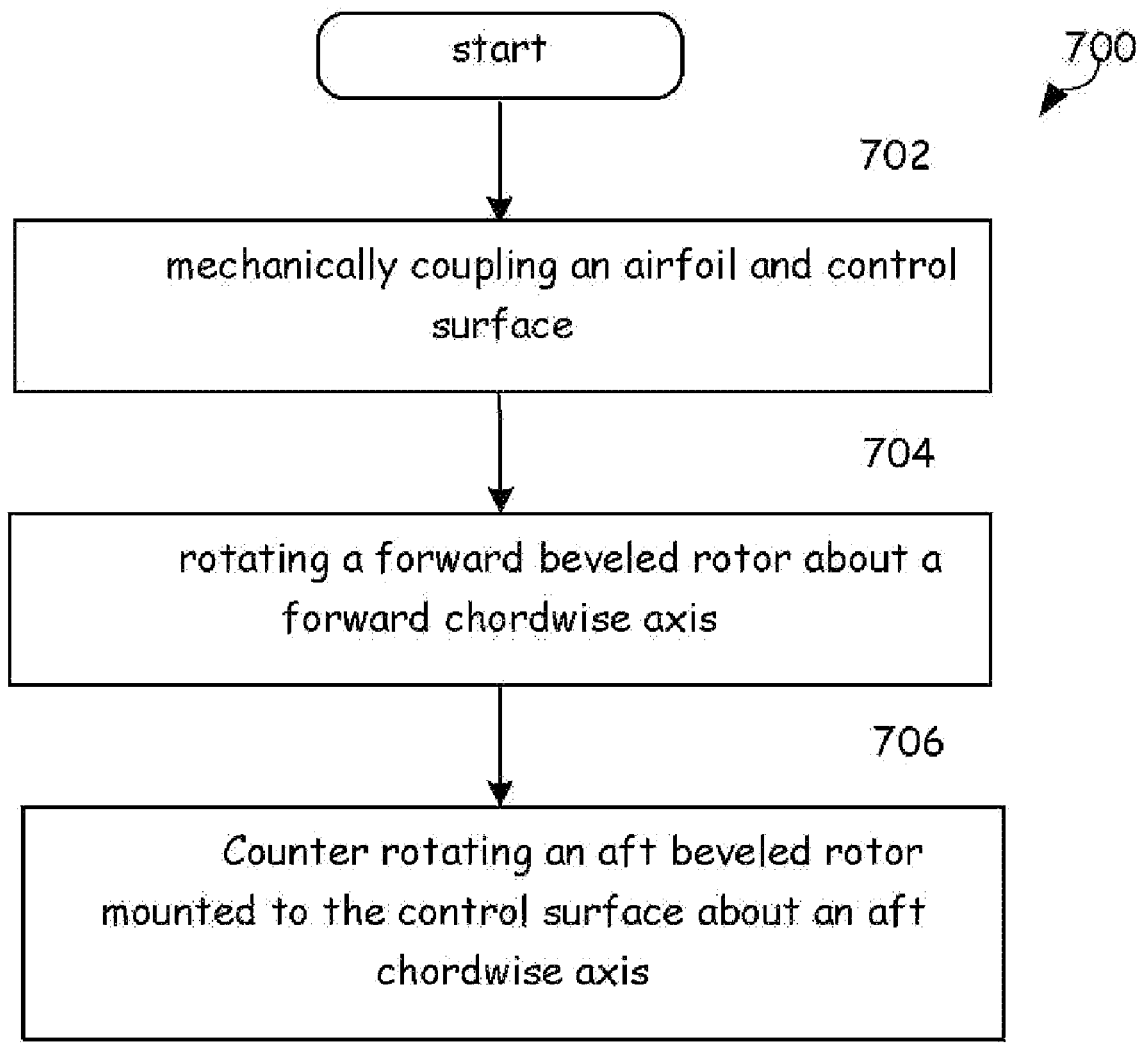
FIGS. 7 and 8 provide logic flow diagrams describing a method to reposition control surfaces with a contra-bevel driven flight control system in accordance with embodiments of the present invention.
Figure 8:
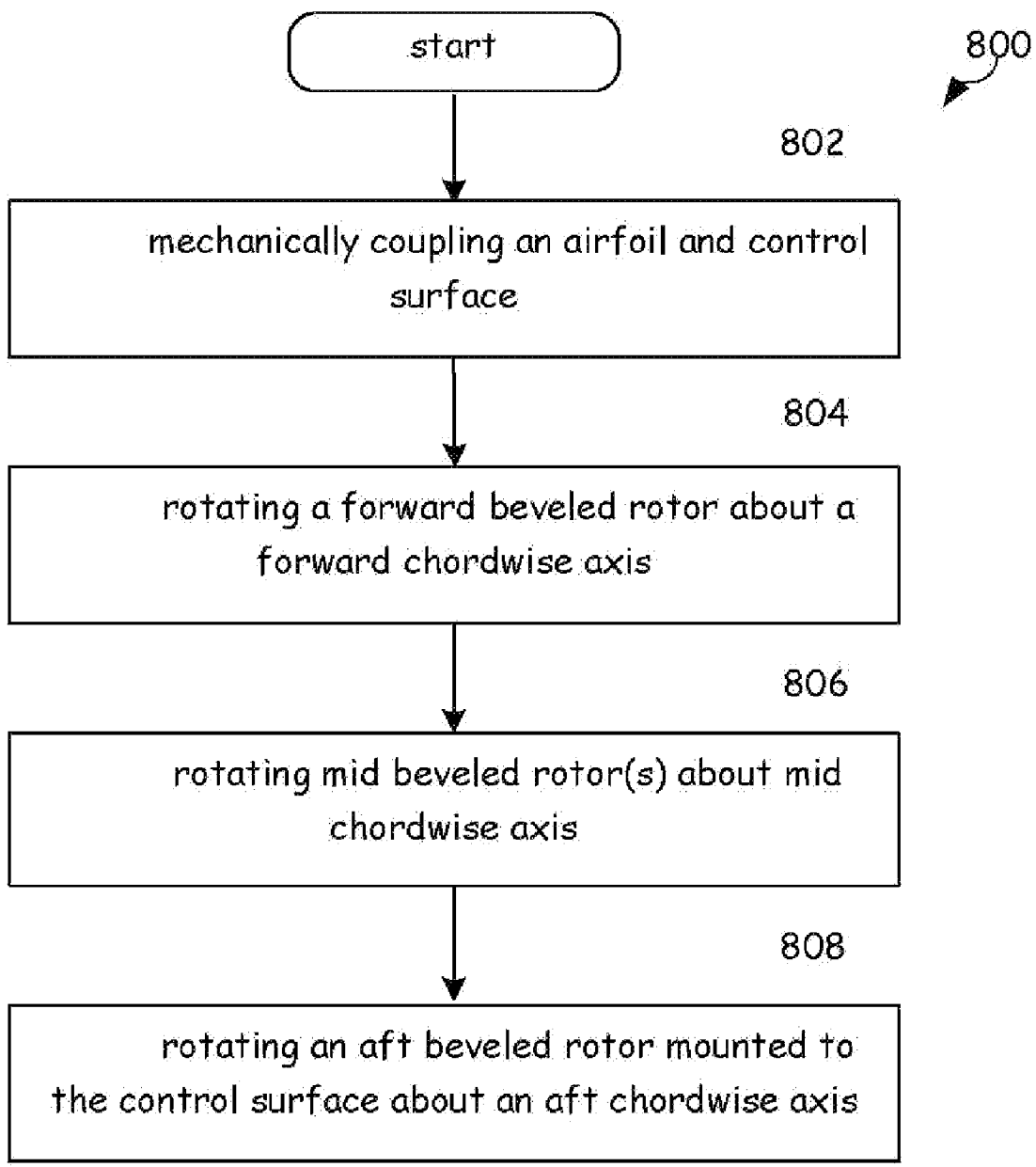

FIGS. 7 and 8 provide logic flow diagrams in accordance with embodiments of the present invention wherein contra beveled rotors are used to reposition or deflect control surfaces. Operations 700 began by mechanically coupling an airfoil and control surface in step 702. In step 704 forward beveled rotors rotated about a forward chordwise axis. Simultaneously in step 706 an aft beveled rotor counter rotates about an aft chordwise axis. The relative angular position of the rotors causes angular deflection of the aft beveled rotor relative to the chordwise axis of the airfoil. This angular deflection in turn deflects the control surface to which the aft beveled rotor is mounted.

In another embodiment depicted in FIG. 8 additional beveled rotor segments are utilized. Operations 800 began with step 802 where an airfoil and control surface are mechanically coupled. In step 804 a forward beveled rotor rotates about forward chordwise axis. Simultaneously in step 806 and 808, a mid beveled rotor rotates about a mid chordwise axis in step 806 and an aft beveled rotor mounted to the control surface rotates about an aft chordwise axis in step 808. The angular repositioning of the beveled rotors causes angular deflection of the aft beveled rotor mounted to the control surface. Thus the aft chordwise axis is deflected relative to the forward chordwise axis within the air foil.

Although as described above, the embodiments of the present invention may not only be applied to the deflection of a control surface within an aircraft. Embodiments of the present invention may be applied to deflect hydrostatic control surfaces as well as dampers within heating ventilation and air conditioning (HVAC) air handling systems. Additionally although this has been shown applied to a trailing edge control surface these concepts may be applied in other embodiments of the present invention to leading edge control surfaces or spanwise control surfaces.

The present invention enables new and improved designs of low-observable tactical aircraft by allowing unconventionally aerodynamic shapes. Low-observable in part takes into consideration such as detection by radar and the radar cross-section associated with a low-observable aircraft.

One method to detect aircraft involves the use of radar. However, not all objects or aircraft reflect the same amount of radar waves, as is known by those skilled in the art. In a low-observable aircraft one would want to reflect as little radar energy as possible to a radar receiver, enabling the plane to go undetected at closer ranges. The amount of radar energy that is reflected by an object can be defined by its radar cross-section. To define the radar cross-section of a target, one calculates the size of a sphere, which would reflect the same amount of radar energy as the aircraft that was measured. The radar cross-section in the square meters is then the area of a circle of the same diameter as the imaginary sphere.

Radar cross-section is not necessarily defined by aircraft size, but is more closely related to its design and construction. Curved surfaces reflect energy in many directions. Therefore, curved surfaces have been historically avoided in favor of flat surfaces. Flat surfaces, like the facets of a diamond, reflect energy in the limited directions of the designers' choice-namely, away from detecting receivers for a low observable aircraft. As the computation power of computers have increased designers need no longer be limited to faceted surfaces, rather surfaces, including curved surfaces, may be modeled and optimized to minimize the amount of radar energy reflected to a detecting receiver.

The contra bevel driven control surface provided by the present invention may be used in a low-observable aircraft surfaces or unconventionally shaped surfaces. In addition to aircraft applications, static architectural structures such as buildings, bridges, and towers may incorporate these devices in their aerodynamic surfaces. Unconventionally shaped surfaces may include aggressive duct offsets. The enhancement of fluid flow over these unconventionally shaped surfaces can help to minimize the size, weight, and structural support required by these surfaces.

The present invention may be used to improve flow behavior in a hydrodynamic application. This may minimize head loss in a piping system, reduce flow noise within a piping system or over a submerged structure or to control and manipulate hydrodynamic flow about a watercraft for direction and thrust control.

Further embodiments of the present invention may include air-handling units such as HVAC systems, chemical processors, automobile air intake manifold or biomedical applications. However, the present invention should not be limited to these applications.

In summary, the contra-bevel driven control mechanism provided by embodiments of the present invention repositions a control surface in a fluid environment such as an aerodynamic or hydrodynamic environment. This involves mechanically coupling an airfoil and a control surface. The control surface may pivot about a spanwise axis between upwardly deflected and downwardly deflected positions. A forward beveled rotor mounted to the airfoil (forward surface) and an aft beveled rotor mounted to the control surface counter rotate. The forward beveled rotor rotates about a forward chordwise axis within the airfoil while the aft beveled rotor rotates about an aft chordwise axis within the control surface. The angular rotation between the forward beveled rotor and the aft beveled rotor deflects the aft beveled rotor and the aft chordwise axis within the control surface. Additionally, this method allows the control surface to be deflected with maximum mechanical advantage when the control surface is fully deflected.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. A flight control system, comprising:
    a forward beveled member having an axis, a first end coupled on an airfoil, a second end terminating in a beveled surface, and the forward beveled member selectively rotatable about its axis with respect to the airfoil;
    an aft beveled member having an axis, a first end coupled on a control surface, a second end terminating in a beveled surface that mates with the forward beveled member second end along an interface oblique to the axes of both members, and the aft beveled member selectively rotatable about its axis with respect to the control surface, so that when one of the forward or aft beveled members rotates with respect to the other, their contact along the oblique interface repositions the members with respect to one another to pivot the control surface with respect to the airfoil.

2. The flight control system of claim 1, wherein the forward bevel member and aft beveled member counter rotate at an about equal angular rate.

3. The flight control system of claim 1, wherein the control surface is hingedly coupled to the airfoil.

4. The flight control system of claim 1, wherein the operator mechanism further comprises a bearing at the interface of the forward beveled member and the aft beveled member.

5. The flight control system of claim 1, further comprising:
    a forward drive motor coupled to the forward beveled member; and
    an aft drive motor coupled to the aft beveled member.

6. The flight control system of claim 5, wherein:
    a universal drive shaft couples the aft drive motor to the aft beveled member; and
    the forward drive motor and aft drive motor are mounted on a forward chordwise axis within the airfoil.

7. The flight control system of claim 1, wherein the operator mechanism further comprises:
    a mid beveled member mounted between the forward beveled member and the aft beveled member, the mid beveled member to rotate to reposition the control surface.

8. The flight control system of claim 1, wherein the forward beveled member and the aft beveled members are contra beveled.

9. The flight control system of claim 1, wherein the forward chordwise axis and the aft chordwise axis are coaxial when the control surface is in a neutral position.

10. The flight control system of claim 1, wherein a mechanical advantage offered by the operator mechanism is maximized when the load on the control surface is also at a maximum.

11. The flight control system of claim 1, further comprising an elastomeric transition section joining the airfoil and the control surface.

12. An operator mechanism coupled between a control surface and an airfoil, comprising:
    a forward beveled member having an axis, an end coupled to the airfoil, another end having a bevel configuration, and selectively rotatable about its axis with respect to the airfoil;
    an aft beveled member having an axis, an end coupled to the control surface, another end having a beveled configuration, and the aft beveled member selectively rotatable about its axis with respect to the control surface; and
    a mid beveled member having an axis, an end with a bevel shaped configuration that mates with the end of the forward beveled member having the bevel and along a plane oriented oblique to the axes of the mid beveled and forward beveled members, and the mid beveled member having another end with a bevel shaped configuration that mates with the end of the aft beveled member having the bevel and along a plane oriented oblique to the axes of the mid beveled and aft beveled member, so that when at least one of the forward, aft, or mid beveled members is rotated, the control surface deflects with respect to the airfoil.

13. The flight control system of claim 12, further comprising a mid drive motor, an aft drive motor, a forward drive motor,
    at least one universal mid drive shaft that couples the at least one mid drive motor to the mid beveled member; and
    a universal drive shaft that couples the aft drive motor to the aft beveled member.

14. The flight control system of claim 13, further comprising:
    a drive motor
    a forward gearing mechanism coupled to the forward beveled member and the drive motor;
    at least one mid gearing mechanism coupled to the at least one mid beveled member and the drive motor; and
    an aft gearing mechanism coupled to the aft beveled member and the drive motor.

15. The flight control system of claim 12, wherein the axis of the forward beveled member, the axis of the mid beveled member, and the axis of the aft beveled member are coaxial when the operator mechanism is in a neutral position.

16. A method to reposition a control surface with respect to an airfoil, the method comprising:
    providing a control mechanism comprising:
        a first member having an axis, an end terminating along a plane oblique to the member axis and an opposite end coupled to the control surface and rotatable with respect to the control surface, a second member having an axis, an end that terminates along a plane oblique to the member axis and that is coupled to the beveled end of the first member, and an opposite end coupled to the airfoil and rotatable with respect to the airfoil; and changing the position of the first member with respect to the second member by rotating at least one of the first or second members about at least one of their respective axes to thereby deflect the control surface with respect to the airfoil.

17. The method of claim 16, wherein the control surface deflects at a substantially constant angular rate.

18. The method of claim 16 wherein the first member comprises a forward beveled member having the end coupled to the control surface and a mid beveled member, wherein the forward and mid beveled members are rotatable with respect to one another and are coupled along an interface lying in a plane oblique to the first member axis.

19. The method of claim 18, wherein the control surface deflects at a substantially constant angular rate.

20. The method of claim 18, wherein a single drive motor is coupled by individual gear mechanisms to each beveled member drive each beveled member.

* * * * *